3,004,085
METHOD OF PREVENTING FOULING
Joseph E. Ewanchyna and Charles M. Finigan, Sarnia, Ontario, Canada, assignors to Polymer Corporation Limited, Sarnia, Ontario, Canada, a corporation
Filed June 3, 1959, Ser. No. 817,859
Claims priority, application Canada May 4, 1959
9 Claims. (Cl. 260—681.5)

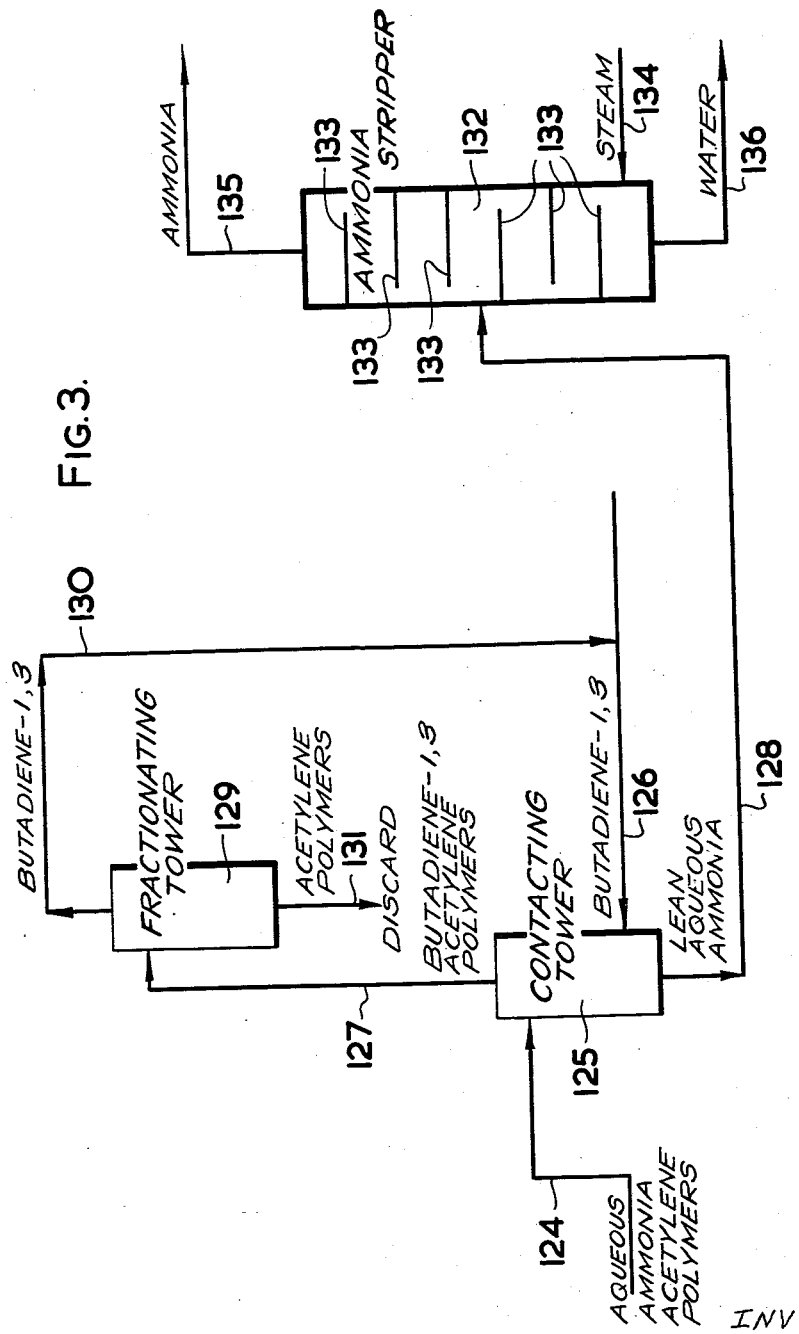

This invention relates generally to an improved process for the extraction of a desired diolefin from a hydrocarbon mixture. More particularly it relates to an improvement in the process of recovery of ammonia from gases desorbed from an aqueous cuprous ammoniacal solvent.

Conjugated diolefins are commercially produced by cracking of higher molecular weight hydrocarbons or by dehydrogenation of more saturated hydrocarbons of the same chain length. Steam cracking of hydrocarbons is commercially employed to produce butadiene and isoprene. Catalytic dehydrogenation of n-butane and n-butylenes is extensively used to produce butadiene-1,3.

Since these reactions are not 100% selective and since they do not proceed to 100% conversion, the product contains unchanged starting material, desired product and undesired by-products among which are acetylenes and carbonyls. For example, in the production of butadiene-1,3 by the dehydrogenation of n-butylenes, the product may contain propylene, n-butene-1, cis-butene-2, trans-butene-2, butadiene-1,2, butadiene-1,3, allenes, pentanes and higher homologues, methyl acetylene, vinyl acetylene, ethyl acetylene, dimethyl acetylene, carbonyls, etc. Therefore, in order to obtain butadiene-1,3 in relatively pure form it is necessary to subject the product to a separation operation.

The extraction of the desired diolefinic compound from the more saturated compounds is conventionally accomplished in a multistage counter-current liquid-liquid extraction train. This process comprises a plurality of stages, each of which consists of a mixer and a settler. The actual number of stages employed depends on the composition of the hydrocarbon stream which is being purified and on the purity of the product desired. Four such stages may be adequate, although it is usual to use from eight to twelve. In the mixers an aqueous cuprous ammoniacal solvent for the diolefin is intimately contacted with the hydrocarbon mixture. The mixtures so formed is separated in the settlers into a solvent phase containing extracted diolefin and a hydrocarbon phase. The solvent phase in each case after being separated in the settler is passed into contact with a hydrocarbon phase having a higher diolefin concentration than the hydrocarbon phase from which it was separated. The hydrocarbon phase from each settler is contacted with a solvent phase having a lower dissolved diolefin content than the one from which it has been separated. After the solvent phase has passed through the mixer and settling chamber of the last stage it is heated and passed to a settling chamber to expel, in the liquid phase, substantially all hydrocarbons except the desired diolefin. The expelled hydrocarbons are separated from the solvent phase and are recycled to the solvent phase passing to the mixer and settling chamber of the last stage. The diolefin rich solvent is then passed to the desorber where the diolefin product is recovered as a gas. The gaseous product is washed to recover vaporized ammonia and then liquified. To achieve phase separation required for the efficient operation of the process, adequate provision must be made for the elimination from the system of any materials which tend to cause entrainment.

A suitable cuprous ammoniacal solvent for a process such as that outlined above may contain any of a number of suitable anions. Examples of such anions include sulfate, phosphate, acetate, lactate, tartrate, borate, carbonate, chloride, fluoride, glycolate, thioglycolate, benzoate, salicylate, etc. For the extraction of butadiene-1,3 from a hydrocarbon stream it is preferred to use as a solvent an aqueous solution containing 2–5 moles of cuprous copper, a trace of cupric copper and greater than 10 moles of ammonia, with the anion being acetate.

It is known that some acetylenes are more soluble in the solvent than the diolefin. For example, it is well known that $C_4$ acetylenes have about forty times greater solubility than butadiene-1,3 in the cuprous ammonium acetate solvent preferred for use in this extraction process. These acetylenes are known to polymerize very readily, particularly at temperatures prevalent in the desorption process and in the presence of cuprous salts. The polymers formed have a strong emulsifying effect, reducing the efficiency of the phase separation.

The presence of carbonyls in the solvent is known to have a suppressing effect on the solubility of hydrocarbon, notably the desired diolefin, in the solvent. Any reduction in the quantity of such carbonyls in the system is considered to be most advantageous.

It has now become common practice to remove the acetylenes in an acetylene removal unit by a pretreatment of the hydrocarbon stream with a small amount of the solvent so that the solvent dissolves essentially all of the acetylenes and a small but significant proportion of the desired conjugated diolefin. Such a procedure is described in United States Patent 2,788,378 issued to Cotton et al. on April 9, 1957. In this process it is normal practice to recover both the conjugated diolefin and the solvent. This is usually accomplished by conventional stripping steps to flash off the dissolved diolefins and acetylenes in successive zones. The stripped solvent is treated for the removal of acetylenic polymers and then used in further extractions either in the acetylene removal unit or butadiene extraction operations.

In the conventional processes for the extraction of diolefins with a prior removal of acetylenes using cuprous ammoniacal salt solution there are several gaseous streams containing ammonia in recoverable quantities. The undissolved hydrocarbon rejected from the main extraction unit, the desorbed diolefin product from the main extraction unit, the desorbed diolefin stream stripped from the solvent in the acetylene removal unit and the desorbed acetylenes stripped from the solvent in the acetylene removal unit all contain ammonia in quantities which justify recovery. These streams are water washed individually and the wash water streams are conveniently combined and passed to the ammonia stripper.

At the temperatures prevailing in the water wash of the acetylenes stripped from the solvent in the acetylene removal unit some polymerization of acetylenes occurs. The term "polymerization of acetylenes" is intended to embrace other related reactions which may be condensation reactions involving acetylenes, carbonyls and ammonia. The products of these reactions together with some free acetylenes and carbonyls are carried off with the wash water to the ammonia stripper. At the temperatures and pressures in the ammonia stripper the wash water contaminants above referred to are converted to solid polymers which seriously accelerate the rate of fouling of that equipment.

It is therefore an object of this invention to improve the method of recovering ammonia from desorbed gases.

It is a further object of the present invention to improve the recovery of ammonia from aqueous solutions of ammonia which contain acetylenes, carbonyls and reaction products thereof.

It is a further object of the present invention to reduce the rate of fouling of ammonia stripping equipment by extracting from aqueous ammoniacal solutions contaminants comprising acetylenes, carbonyls and reaction products thereof before stripping ammonia from such solutions.

It is a further object of the present invention to remove contaminants from the wash water from the acetylene wash tower before such wash waters are combined with others entering the ammonia stripper.

It is a further object of the invention to extract contaminants from the wash water from the acetylene wash tower before such contaminants enter the ammonia stripper system where they cause fouling of vessels and towers.

In accordance with the present invention the process of removing acetylenes, carbonyls and reaction products thereof from aqueous solutions of amonia comprises contacting said solution with a liquified light hydrocarbon to extract such contaminants from said solution.

In a preferred embodiment of the invention the process involves contacting a mixed hydrocarbon stream containing butadiene-1,3, acetylenic and other impurities with a cuprous ammonium acetate solvent, the weight ratio of hydrocarbon mixture to solvent being between 10:1 and 1:1, whereby to dissolve said acetylenic impurities, passing the solvent containing the dissolved acetylenes to at least one stripping zone, water washing the stripped acetylenes to dissolve vaporized ammonia, contacting the wash water with a liquid butadiene-1,3 stream whereby to extract from the wash water acetylenic polymers, free acetylenes and other impurities before ammonia is stripped from the wash water and recovering the butadiene as a distillate free of the extract.

In drawings which illustrate diagrammatically the steps carried out in the present invention, FIG. 1 is a representation of one of the broader embodiments of the invention;

FIG. 3 is a further embodiment of the invention shown in FIG. 2.

Figure 1:
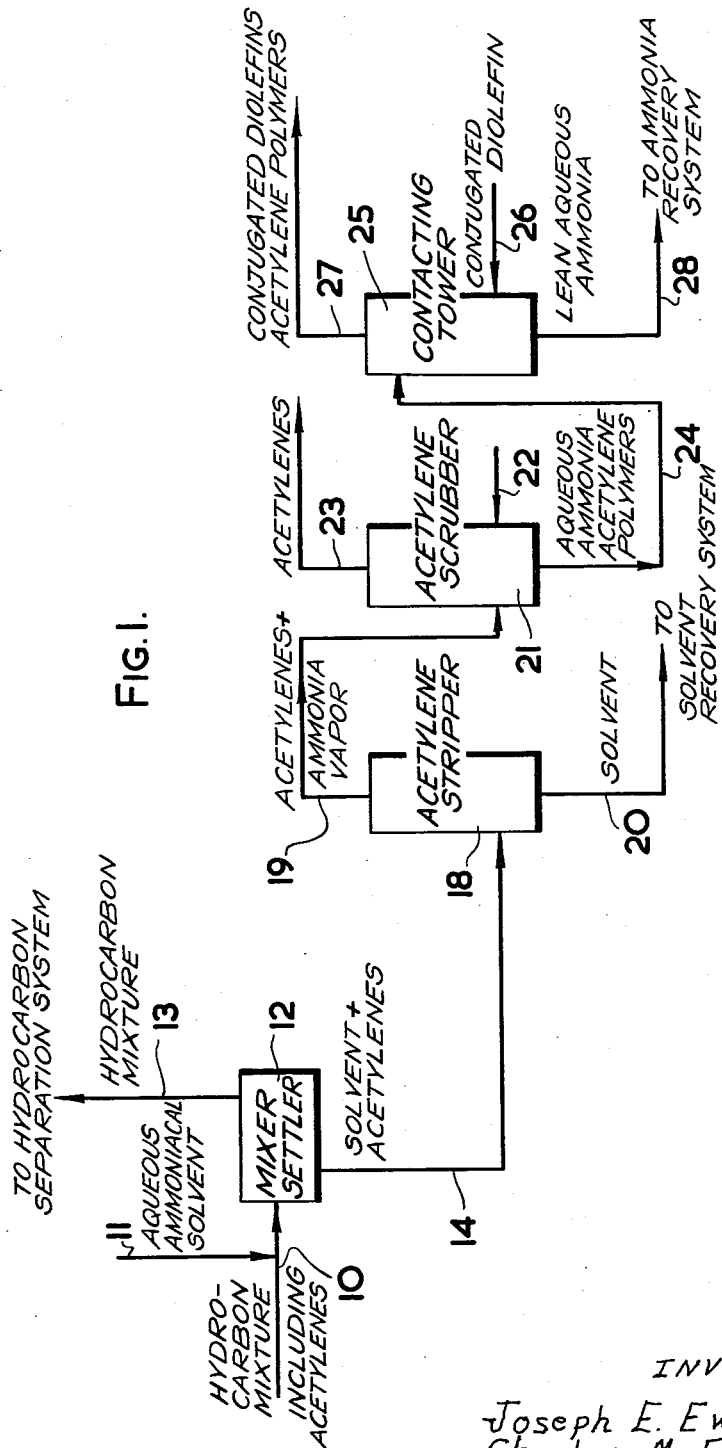

As shown in FIG. 1, the mixture of hydrocarbons, i.e. olefins, conjugated diolefins, acetylenes, carbonyls, etc. in pipe 10 is mixed with the aqueous ammoniacal cuprous salt solvent, in line 11, and enters settler tank 12 at approximately 0° C. The mixture separates into two phases; the upper hydrocarbon phase is drawn off through outlet 13 and is passed to the diolefin extraction system (not shown) where the conjugated diolefins are separated from the remainder of the hydrocarbons. The lower phase, consisting of the solvent, dissolved acetylenes, and some carbonyls, is led via line 14 to acetylene stripper 18.

In acetylene stripper 18 the solvent containing the acetylenes and carbonyls is heated to a temperature of 75° C.–90° C. so that free acetylenes and some carbonyls are desorbed and separate as overhead, leaving the acetylene stripper through line 19. At the temperature necessary to strip the free acetylenes from the solvent, some ammonia from the solvent is also released. Accordingly, the overhead acetylenes leaving via line 19 contain entrained ammonia vapours. The bottoms solvent containing acetylene polymers, some unstripped free acetylenes and some carbonyls is led via outlet 20 to the solvent recovery system (not shown).

Line 19 leads to acetylent wash tower 21 where the acetylenes and entrained ammonia vapour are water washed, at a temperature of about 60° C., with water entering through line 22. The washed acetylenes are removed from the system through exit 23. At the temperature used to assure substantially complete removal of acetylenes from the aqueous solution of ammonia, polymeric materials, referred to in this specification as "acetylene polymers," are formed. These acetylene polymers, some free acetylenes and carbonyls contaminate the aqueous ammonia leaving the wash tower through line 24 which leads to contacting tower 25.

In contacting tower 25 the aqueous ammonia is in intimate contact with a liquified light hydrocarbon entering via line 26. The light hydrocarbon dissolves the acetylene polymers and other contaminants and the solution so formed leaves via outlet 27. The lean aqueous ammonia resulting from such contacting operation is led, via line 28, to the ammonia stripper system (not shown).

Figure 2:
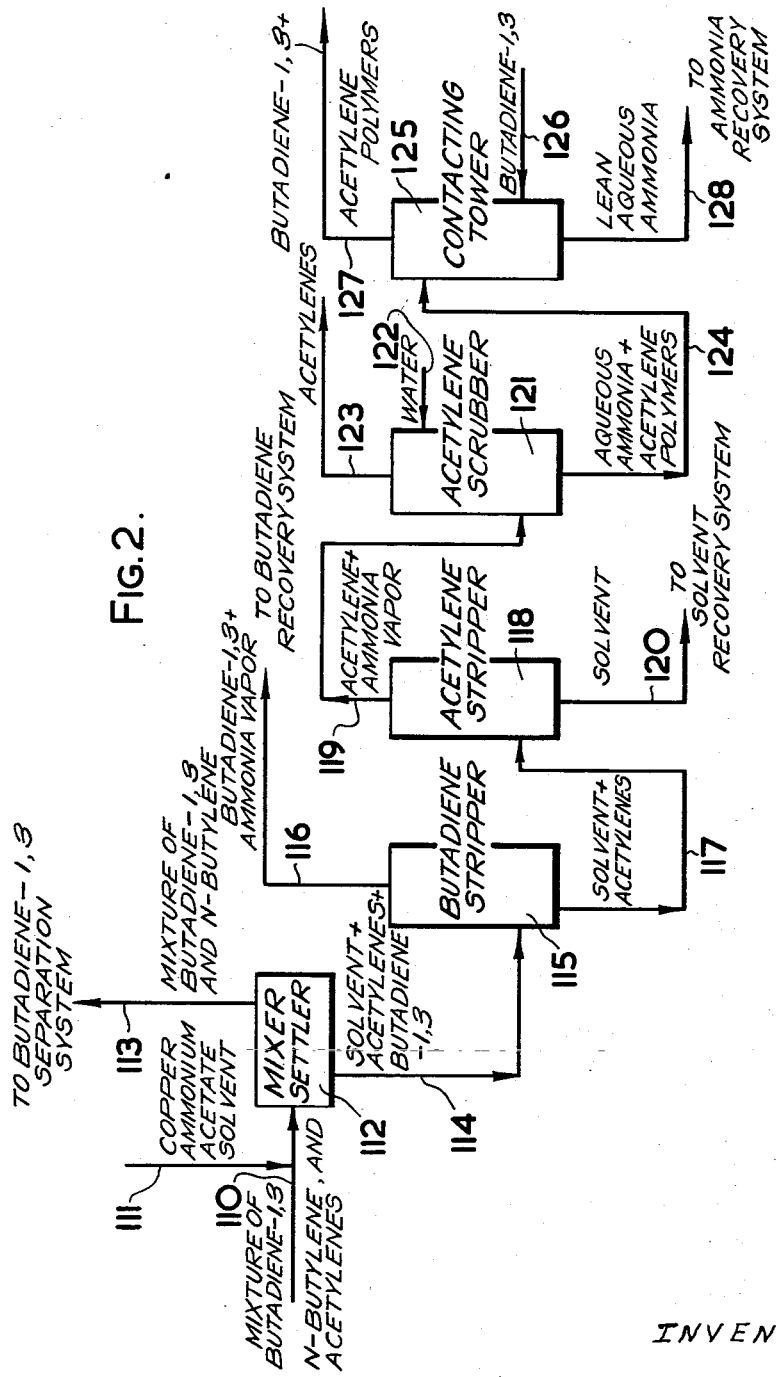
FIG. 2 is a representation of a preferred embodiment of the invention.

In the embodiment shown in FIG. 2, to a hydrocarbon mixture of butadiene-1,3, n-butylenes, acetylenes, carbonyls, etc. in line 110 is added a cuprous ammonium acetate solvent entering via line 111. The hydrocarbon-solvent mixture enters settler 112 at approximately 0° C. Two phases are formed continuously and the upper or hydrocarbon phase, comprising butadiene-1,3, n-butylene, etc., but without any substantial amount of acetylenes is led, via line 113 to a butadiene-1,3 extraction system (not shown). The lower or solvent phase, containing dissolved acetylenes as well as an incidentally dissolved small but significant amount of butadiene-1,3 and some carbonyls, is led via line 114 to a butadiene stripper 115.

In the butadiene stripper the solvent is stripped at temperatures and pressures sufficient to liberate the butadiene-1,3 but insufficient to liberate the acetylenes. However this temperature is sufficient to liberate ammonia vapour from the solvent. Hence the butadiene-1,3 leaving the butadiene stripper 115 contains ammonia vapour. The butadiene-1,3 containing ammonia vapour is led via line 116 to a butadiene wash tower (not shown). The aqueous solution of ammonia formed in such butadiene wash tower is led to the ammonia stripper (also not shown) where the water is separated from the ammonia vapour. The bottoms leaving butadiene stripper 115, comprising solvent containing acetylenes and some carbonyls, is then led to acetylene stripper 118 via line 117.

In the acetylene stripper 118 the solvent is stripped to liberate dissolved free acetylenes. The bottoms solvent containing acetylene polymers and reduced quantities of free acetylene is led via line 120 to a solvent recovery system (not shown). At the temperatures and pressures sufficient to liberate appreciable quantities of acetylenes from the solvent, additional ammonia vapours are liberated from the solvent. Accordingly, the overhead acetylenes leaving via outlet 119 containing ammonia vapours and some carbonyls are led to acetylene wash tower 121.

In acetylene wash tower 121 the acetylenes containing ammonia vapour are washed at a temperature of about 60° C. with water entering via line 122. Such temperature is desirable to reduce the solubility of acetylenes in the wash water and, at such temperatures, polymeric materials, referred to in this specification as acetylene polymers, are formed. The washed acetylenes are removed from the system via line 123 and the aqueous ammonia bottoms are drawn off via line 124. The acetylene polymers together with some free acetylenes and carbonyls remain in the bottoms to contaminate the aqueous ammonia. The aqueous ammonia and contaminants are led via line 124 to contacting tower 125.

The aqueous ammonia and contaminants entering tower 125 are contacted with liquified light hydrocarbon entering via line 126. The overhead leaving the tower through outlet 127 comprises liquid light hydrocarbon having dissolved therein the acetylene polymer and other contaminants. The bottoms comprising lean aqueous ammonia is led via line 128 to an ammonia stripper system (not shown).

The liquid light hydrocarbon stream containing the acetylene polymers and other contaminants leaving contacting tower 125 via line 127 may be treated in a fractionating tower shown in FIG. 3 as 129. Tower 129 is operated at temperatures and pressures which vaporize the light hydrocarbon, and the light hydrocarbon free of contaminants is taken overhead via line 130 to line 126. The acetylene polymers and carbonyls are discarded via outlet 131.

The lean aqueous ammonia is led to the ammonia stripper system, whose main component as shown in FIG. 3 is an ammonia stripper 132. The ammonia stripper contains a plurality of trays, shown diagrammatically as 133. The aqueous ammonia is heated by contacting counter-currently with steam, entering via inlet 134. The ammonia relatively free of acetylenes and carbonyls is recovered through outlet 135, while the water is removed through drain 136.

There are many variations in the process of the present invention such as temperature and pressure of the extraction process, ratio of liquified extractant to aqueous ammoniacal solution and concentration of diolefin in the extractant. While the temperature and pressure ranges through which the process is operable are wide, it will be apparent to one skilled in the art that it is convenient to conduct the extraction at a temperature in the order of the bottoms temperature of the acetylene wash tower. Data indicate that the temperature of the extraction process of the present invention is not critical. The requirement with respect to pressure is to maintain the extractant liquid at the temperatures employed. The ratio of contaminated aqueous ammonia solution to hydrocarbon extractant is that which provides for intimate contact and the data show ratios of 4:1 to 2:1 to be effective and indicate that ratios of 1:1 would be equally or more effective, particularly where a high concentration of contaminants is present in the acetylene wash water.

While some latitude in the selection of a light hydrocarbon extractant is permissible, it is obvious that such streams should be relatively free of acetylenic hydrocarbons and carbonyls. The term liquefied "light hydrocarbon" is intended to embrace paraffinic and olefinic hydrocarbon fractions selected from those containing 3 to 5 hydrocarbons.

$C_4$ hydrocarbons are preferred as they may be liquified at practical temperatures and pressures and may readily be recovered as a distillate free of contaminants. A predominantly butadiene-1,3 fraction is preferred over other $C_4$ olefins and $C_4$ paraffins.

EXAMPLE I

A series of tests were conducted to ascertain the effect of temperature on the solubility of contaminants in liquified butadiene-1,3 of 85% purity. The tests were also carried out to determine the effect of different ratios of aqueous ammonia solution from the acetylene wash tower to extractant. All tests were conducted in 30 fl. oz. bottles capable of withstanding 100 lb. pressure and capped with butyl rubber self-sealing gaskets and a pierced crown top.

Each bottle was purged with nitrogen and a measured amount (250 grams in all cases) of the acetylene wash water bottoms was introduced and cooled to −7° C. The required amount of liquified butadiene to achieve the desired ratio (e.g. 62.5 grams for 4:1 ratio) was then added. The bottles were capped and placed in ovens at various temperatures. Agitation was achieved by means of rollers and continued for one hour to ensure that equilibrium conditions had been reached.

Immediately upon removal of the bottles from the oven the aqueous ammonia phase was withdrawn through a hypodermic needle.

The amount of polymer extracted by the liquified butadiene remaining in the bottle was then determined.

The tests were repeated at various temperatures and weight ratios and the data are shown in Table I.

*Table I*

| Test No. | Temperature °C. | Weight Ratio Wash Water: Hydrocarbon Extractant | gms. Polymer Extracted |
|---|---|---|---|
| 1 | 27 | 4:1 | 0.159 |
| 2 | 27 | 3:1 | 0.110 |
| 3 | 27 | 2:1 | 0.115 |
| Average | | | 0.128 |
| 4 | 38 | 4:1 | 0.156 |
| 5 | 38 | 3:1 | 0.165 |
| 6 | 38 | 2:1 | 0.147 |
| Average | | | 0.156 |
| 7 | 43 | 4:1 | 0.151 |
| 8 | 43 | 3:1 | 0.153 |
| 9 | 43 | 2:1 | 0.169 |
| Average | | | 0.156 |
| 10 | 50 | 4:1 | 0.140 |
| 11 | 50 | 3:1 | 0.179 |
| 12 | 50 | 2:1 | 0.173 |
| Average | | | 0.163 |
| 13 | 55 | 4:1 | 0.127 |
| 14 | 55 | 3:1 | 0.195 |
| 15 | 55 | 2:1 | 0.157 |
| Average | | | 0.163 |

These results are interpreted to show that at temperatures within the limits of the laboratory equipment, i.e., up to 55° C., extraction of contaminants was effective, and in the range of 38°–55° C. showed the average amount of polymer extracted to be 0.160±0.004 gram.

It is characteristic of such wash tower bottoms that they are quite clear unless contaminated with polymers. Contaminated streams are cloudy and on prolonged standing discolour to yellow or brown shades. The wash water samples after treatment in accordance with this example remained clear for extended periods.

The samples of acetylene wash tower bottoms were analyzed for free acetylenes before and after extraction of contaminant in the above tests and were found to have been reduced from 110 p.p.m. to 5 p.p.m.

EXAMPLE II

The procedure of Example I was repeated on two samples of acetylene wash tower bottoms known to contain unusually high concentrations of acetylenic polymers. Two light hydrocarbon extractants were employed on each sample. The data are shown in Table II.

*Table II*

| Test No. | Temp., °C. | Weight Ratio Wash Water: Extractant | gms. of Polymer Extracted by Butane | gms. of Polymer Extracted by Butadiene-1,3 (85%) |
|---|---|---|---|---|
| 1 | 38 | 2:1 | 0.35 | 0.45 |
| 2 | 38 | 3:1 | 1.18 | 1.49 |

The concentration of polymers in the samples of wash tower bottoms used in test No. 2 was virtually ten times that of the samples run in Example I.

The data of Table II indicate that a $C_4$ paraffin is only 80% as effective as $C_4$ diolefin of 85% purity. Nevertheless, the data do demonstrate that an appreciable improvement in the wash tower bottoms may be effected by a saturated light hydrocarbon.

EXAMPLE III

A pilot plant scale extraction process was conducted using an Oldshue column as the contacting tower between the aqueous ammonia solution and a light hydrocarbon mixture comprising 85% butadiene-1,3 and 15% impurities, predominantly butylenes and butane. The aqueous ammonia solution containing acetylenic polymers, dissolved acetylenes and carbonyls was passed to the top of the Oldshue column while the light hydrocarbon mixture was passed to the bottom of the column. The rotor speed of the Oldshue column was 100 r.p.m. Equipment limitations precluded temperatures in excess of 40° C.

Other particulars of the pilot plant operation and the data are set out in Table III.

*Table III*

| | |
|---|---|
| Average aqueous feed, lbs./hr | 462 |
| Average hydrocarbon feed, lbs./hr | 117 |
| Average hydrocarbon feed temperature, °C | 20 |
| Average column pressure, p.s.i.g | 41 |
| Average aqueous feed to hydrocarbon feed weight ratio | 3.9:1 |
| Average total throughput per hour per square foot, U.S.G | 398 |

| Run | Aqueous Feed Temperature, °C. | Polymer in Hydrocarbon Overhead, Wt. Percent | Carbonyls in Hydrocarbon Overhead, Wt. Percent | Free Acetylenes in— | |
|---|---|---|---|---|---|
| | | | | Aqueous Feed to Column, p.p.m. | Aqueous Effluent, p.p.m. |
| 1 | 27 | 0.11 | 0.67 | 121 | 15 |
| 2 | 38 | 0.32 | 1.32 | | |
| 3 | 40 | 0.23 | 1.17 | 75 | 6 |

The quantity of acetylene polymers and free acetylenes in the aqueous ammonia solution is known to vary widely, whereas the concentration of carbonyls is thought to be relatively constant at least over short periods.

While the data show increased quantities of polymer extracted at 38° C. or 40° C. over those extracted at 27° C., the latter or even lower temperatures are deemed practical. The temperature of the acetylene wash tower may even be reduced, since the efficiency of the process of this invention is removing free acetylenes from the aqueous ammonia reduces the disadvantage of having free acetylenes dissolved in the latter stream.

What we claim is:

1. In a process for the separation of butadiene from a mixture thereof with other hydrocarbons and hydrocarbon compounds comprising acetylenes and carbonyls with a cuprous ammoniacal acetate solvent wherein the gases stripped from the solvent are water washed for the recovery of ammonia vapours as a dilute aqueous ammoniacal stream containing acetylenes and hydrocarbon compounds as contaminants and the ammonia is subsequently stripped from the wash water, the improvement which comprises contacting the aqueous ammoniacal stream with a liquified light hydrocarbon containing 3-5 carbon atoms and separating the liquified light hydrocarbon with contaminants dissolved therein from the aqueous ammoniacal stream before the ammonia is stripped therefrom.

2. The process of claim 1 wherein the liquified light hydrocarbon is an unsaturated hydrocarbon containing 4 carbon atoms.

3. In the process of separating a conjugated diolefin from mixtures thereof with other hydrocarbons including acetylenes with a cuprous ammoniacal acetate solvent comprising the steps of absorbing acetylenes in the solvent, stripping at least part of the acetylenes from the solvent, water washing the stripped acetylenes to dissolve vapourized ammonia, and stripping the ammonia from the wash water, the improvement which comprises contacting the ammoniacal wash water with a liquified light hydrocarbon containing 3-5 carbon atoms to extract contaminants from the wash water before ammonia is stripped therefrom.

4. The process of claim 3 where the conjugated diolefin is butadiene-1,3.

5. The process of claim 3 where the conjugated diolefin and the liquified light hydrocarbon are butadiene-1,3.

6. In the process of butadiene extraction by means of a cuprous ammonium acetate solvent from a hydrocarbon stream wherein the hydrocarbon stream is contacted with a small stream of solvent before the hydrocarbon stream comes in contact with the main body of the solvent in the extraction unit, whereby to absorb acetylenes in the solvent, separating the dilute hydrocarbon stream from the solvent containing the acetylenes dissolved therein, stripping the acetylenes from the solvent, water washing the stripped acetylenes to form a dilute aqueous solution of ammonia, the improvement comprising intimately contacting the dilute aqueous solution of ammonia with a liquified light hydrocarbon containing 3-5 carbon atoms whereby to dissolve acetylenic polymers and other contaminants, separating the dilute aqueous solution of ammonia from the said hydrocarbon before stripping the ammonia from the dilute aqueous solution.

7. The process of claim 6 where the liquified light hydrocarbon is butadiene-1,3.

8. The process of claim 6 where the ratio of ammoniacal wash water to liquified light hydrocarbon is in the range of 1:1 to 4:1.

9. The process of claim 6 where the zone in which the dilute aqueous solution of ammonia is contacted with a liquified light hydrocarbon is at a temperature of at least 27° C.

References Cited in the file of this patent

UNITED STATES PATENTS

| | | |
|---|---|---|
| 1,571,986 | Weindel | Feb. 9, 1926 |
| 2,549,555 | Wilson | Apr. 17, 1951 |
| 2,604,485 | Booker et al. | July 22, 1952 |
| 2,870,232 | Wilson et al. | Jan. 20, 1959 |